United States Patent [19]

Wollar

[11] Patent Number: 4,832,551
[45] Date of Patent: May 23, 1989

[54] FASTENER HAVING PRESS-ON PLASTIC NUT

[75] Inventor: Burnell Wollar, Barrington, Ill.

[73] Assignee: Phillips Plastics Corporation, Phillips, Wis.

[21] Appl. No.: 142,023

[22] Filed: Jan. 11, 1988

[51] Int. Cl.$^4$ ............................................ F16B 39/284
[52] U.S. Cl. .................. 411/280; 403/407.1; 411/324; 411/369; 411/437; 411/542
[58] Field of Search ............... 411/512, 908, 301, 324, 411/276, 277, 280–282, 436–437, 918, 368–369, 542, 546, 435; 403/406.1, 407.1

[56] References Cited

U.S. PATENT DOCUMENTS

| | | | |
|---|---|---|---|
| 168,597 | 10/1875 | Atwood | 411/280 |
| 929,027 | 7/1909 | Schumann | 411/436 X |
| 2,364,668 | 12/1944 | Simmons | 411/437 |
| 2,400,072 | 5/1946 | Burke | 411/277 |
| 3,001,567 | 9/1961 | Brill | 411/301 X |
| 3,670,917 | 6/1972 | Nishimaki et al. | 411/368 X |
| 4,236,561 | 12/1980 | Monticelli | 411/280 |
| 4,435,111 | 3/1984 | Mizusawa | 411/512 X |
| 4,600,344 | 7/1986 | Sutenbach et al. | 411/435 |
| 4,756,654 | 7/1988 | Clough | 411/512 X |

FOREIGN PATENT DOCUMENTS

| | | | |
|---|---|---|---|
| 1108867 | 9/1955 | Italy | 411/369 |
| 10396 | of 1886 | United Kingdom | 411/280 |
| 707614 | 4/1954 | United Kingdom | 411/280 |
| 1046456 | 10/1966 | United Kingdom | 411/542 |

*Primary Examiner*—Lloyd A. Gall
*Assistant Examiner*—Curtis B. Brueske
*Attorney, Agent, or Firm*—James E. Nilles; Thomas F. Kirby

[57] ABSTRACT

A fastener for releasably securing an object to a panel having a hole therethrough comprises a screw having a screw head attached to the object and having a threaded screw shank insertable through the hole in the panel. The fastener further comprises a flexible resilient plastic push-on/screw-off nut having a bore therethrough which is slidably mountable onto the threaded screw shank into engagement with the panel. The nut has a resilient flexible concave nut head which operates to seal the panel hole and has a nut shank defining two resilient flexible legs, each of which has internal nut threads for engaging the threaded screw shank. The nut also comprises webs, each connected between the nut head and the outer side of a leg, which operate to force the nut threads tightly against the screw thread in locking engagement when the nut head is forced against the panel. The nut is removable from the screw by rotation in a conventional manner. The fastener also comprises an optionally usable washer which is disposed between the screw head and the panel and operates to further seal the panel hole.

5 Claims, 2 Drawing Sheets 4,832,551

FASTENER HAVING PRESS-ON PLASTIC NUT

FIELD OF USE

This invention relates to a fastener comprising a screw, a plastic press-on/screw-off nut for said screw and an optionally usable press-on sealing washer. The nut, when axially pushed onto the screw which extends through a hole in a panel, operates to seal the hole on one side of the panel and to releasably lock onto the screw until rotatably unscrewed. The washer seals the hole on the other side of the panel.

DESCRIPTION OF THE PRIOR ART

In some products, it is necessary to removably attach an object to a panel. In automobiles for example, a rigid decorative applique panel is removably attached to the exterior of a sheet metal panel forming the passenger compartment of a car by means of a plurality of fasteners. Each fastener comprises a screw, a nut and any necessary washers. The screw comprises a helically threaded screw shank and the screw head is non-rotatably and permanently secured to the inside surface of the applique panel. The threaded screw shank extends through a hole in the sheet metal body panel and, heretofore, a conventional threaded nut was rotatably screwed onto that portion of the screw shank from inside the auto body, either manually or by a power wrench. In order to seal the hole against water leakage, conventional sealing washers were disposed on the screw shank between the screw head and the outer side of the sheet metal body panel and between the inner side of the sheet metal body panel and the nut. A conventional lockwasher was also disposed on the screw shank between the nut and the sealing washer on the inside of the sheet metal body panel. Removal of the applique panel required the nuts on the several fasteners to be unscrewed.

Needless to say, manual installation of a sealing washer, lockwasher and a conventional screw-on nut on the screw shank on the inside of the sheet metal body panel is time-consuming and costly, in view of the labor and parts involved.

The following U.S. patents show the state of the art and copies are enclosed: U.S. Pat. No. 4,435,111 to Mizusawa; U.S. Pat. No. 4,600,344 to Sutenbach; U.S. Pat. No. 3,449,799 to Bien; U.S. Pat. No. 4,478,545 to Mizusawa; and U.S. Pat. No. 2,364,668 to Simmons.

The Mizusawa and Sutenbach patents disclose plastic push-on fasteners. However, neither has open-ended slots on opposite sides of the shank to get leg flexibility.

SUMMARY OF THE PRESENT INVENTION

In accordance with the present invention there is provided an improved fastener comprising a screw, a press-on nut for the screw, and an optionally usable sealing washer. The fastener is especially well-adapted for use in the automotive industry to attach a decorative applique panel to a sheet metal auto body panel but could be used to attach some other form of object to a panel having a hole therethrough and could have other uses.

The press-on nut is adapted for use with a screw having a threaded screw shank which is insertable through a hole in a panel. The nut has a bore and is slidably mountable on the threaded screw shank into engagement with the panel and is rotatably removable from the threaded screw shank. The nut is operable, when disposed on the screw shank and engaged with the panel, to seal the hole and to lockingly engage the threaded screw shank.

More specifically, the fastener is usable for releasably securing an object to a panel having opposite sides and having a hole therethrough. The fastener comprises the screw which is adapted for attachment to the object and a screw shank with a helical screw thread thereon which is insertable from one side of the panel through the hole in the panel. The nut is slidably insertable onto that portion of the screw thread extending from the other side of the panel. The nut, which is formed of resiliently flexible plastic, comprises a nut shank having a front end and a rear end, and a nut head integrally formed at the front end of the nut shank. A bore extends through the nut shank and nut head. The bore portion nearest the nut head is unthreaded and of a diameter the same as or larger than the diameter of the screw thread. The remaining bore portion is threaded and those nut threads nearest the unthreaded bore portion have a greater inside diameter than the rest so as to facilitate screw insertion. The nut head is flexible and has a front surface and a rear surface. The front surface of the nut head is engageable with the other side of the panel and has a concave depression formed therein. The nut shank has a plurality of slots formed therein extending from the rear end of the nut shank toward the rear surface of the nut head and communicating with the bore. Each pair of adjacent slots define or bound a resiliently flexible leg. Each leg has nut threads on a portion thereof confronting the bore for engagement with the screw thread on the screw shank. A plurality of webs are integrally formed on the nut and extend between the legs and the rear surface of the nut head for transmitting motion from the nut head to the legs.

The optionally usable washer, which is fabricated of resiliently flexible elastomeric material and has a collar, a concave surface and an undersized hole, is disposed on the screw shank between the panel and the object to seal the opposite side of the hole in the panel. The threads on the screw shank seal in the undersized hole in the washer.

In operation, the sealing washer is attached to the panel by press fitting the collar into the hole in the panel. The object is attached to the panel by pressing a threaded screw shank through the undersize hole in the sealing washer. The press-on nut is pushed onto the threaded screw shank from the rear of the panel. A slight turn of the nut snugs it up. The slots in the nut allow the legs to spread as the nut is pushed on. If the object is attempted to be pried off by pulling, pressure is exerted to effect locking of the nut against the threaded nut shank. To remove it, the nut must be unscrewed.

A fastener, press-on nut and sealing washer, if used, offer several advantages over the prior art. For example, the nut performs a sealing function and a locking function. The washer performs an additional sealing function. The nut is economical to fabricate, and easy and economical to install. Other objects and advantages of the invention will hereinafter appear.

DRAWINGS

DESCRIPTION OF PREFERRED EMBODIMENT

Figure 1:
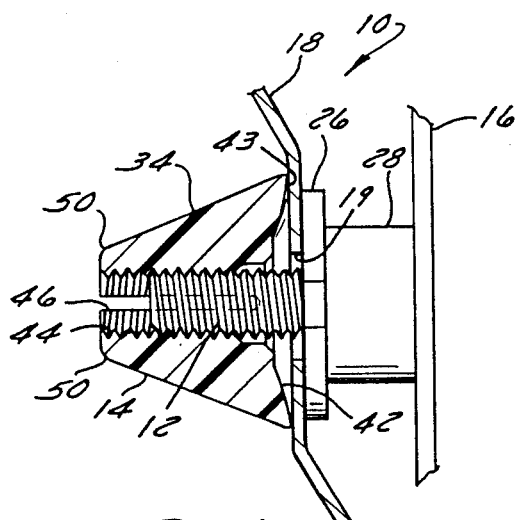
FIG. 1 is a side elevation view, partly in cross-section, showing one embodiment of a fastener in accordance with the invention and comprising a screw and a nut.
Figure 2:
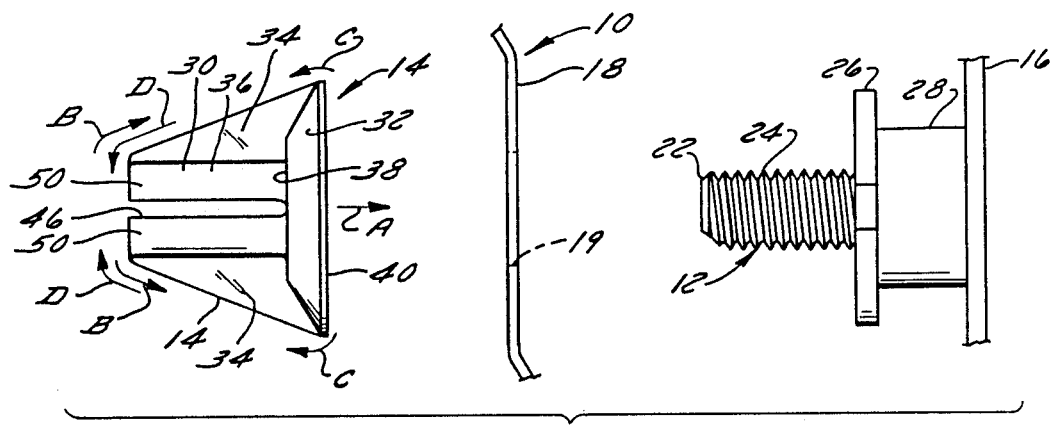
FIG. 2 is an exploded view of the fastener of FIG. 1.

FIGS. 1 and 2 show a first embodiment of the invention in the form of a fastener 10 which comprises a screw 12 and a press-on/screw-off nut 14 and which is used to releasably attach a first panel or object 16 to a second panel 18. Panel 18 has a circular panel hole 19 for receiving screw 12. Nut 14 is shown in detail in FIGS. 5 through 8.

Figure 3:
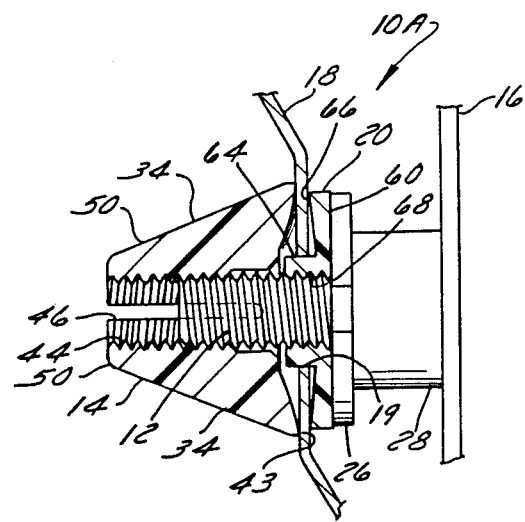
FIG. 3 is a view similar to FIG. 1 showing another embodiment of the invention and comprising a screw, nut and washer.

FIGS. 3 an 4 show a second embodiment of the invention, similar to the first embodiment, but which also employs a washer 20, hereinafter described in detail.

Referring to FIGS. 1 and 2, first panel 16 may, for example, take the form of an outer applique panel which serves a decorative purpose and which is detachably mounted by means of a plurality of fasteners 10 in spaced relationship on the exterior of second panel 18 which takes the form of a sheet metal body panel defining the passenger compartment of an automobile.

Figure 9:
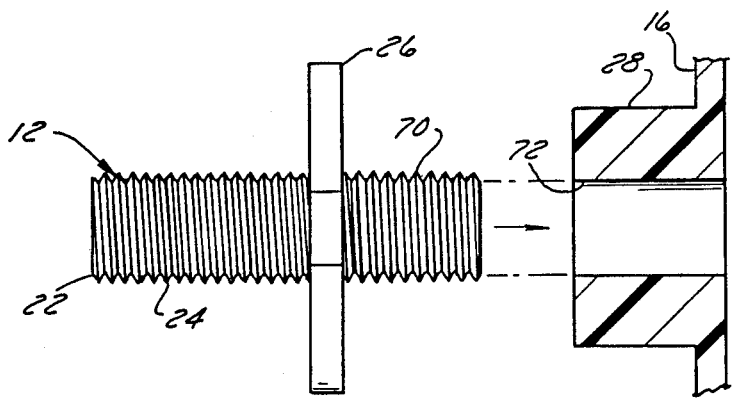
FIG. 9 is a side elevation view showing the manner in which the screw is affixed to an object, such as a panel.

Screw 12 of fastener 10 comprises a cylindrical screw shank 22 having a helical screw thread 24 thereon and a screw head 26 at the head end of the screw. Screw 12 could be metal or plastic. Screw head 26 is non-rotatably connected by a spacer 28 to the inside surface of applique panel 16. As FIG. 9 shows, screw 12 is part of a one-piece molded plastic component which further comprises integrally formed head 26 and an integrally formed screw 70 having threads thereon which are adapted to be self-threading in the wall of a bore 72 in plastic spacer 28 which is integrally formed on plastic applique panel 16. If preferred, head 26 could be omitted. Furthermore, screw 12 itself could be integrally formed on, or otherwise secured to, applique panel 16.

Figure 8:
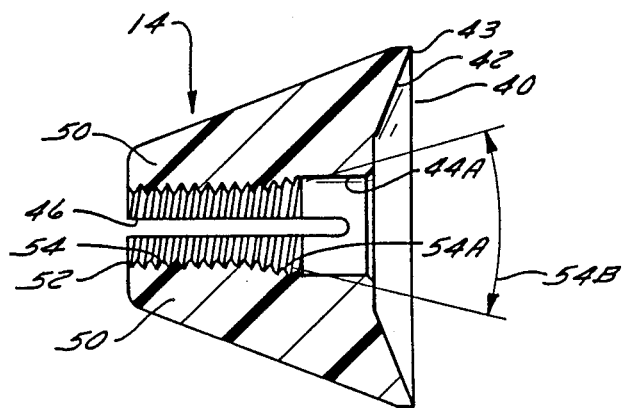
FIG. 8 is an enlarged cross-section view of the nut taken on line 8—8 of FIG. 7 and shows details of the nut bore and nut threads therein.

The nut 14 of fastener 10, which is fabricated of flexible resilient material such as plastic (for example, nylon) by injection molding, comprises a nut shank 30, a relatively large diameter resiliently flexible nut head 32 integrally formed at the head end of the nut shank, a plurality (two) of integrally formed webs 34 extending between the outer side 36 of the nut shank and the rear surface 38 of the nut head. The front surface 40 of nut head 32 is provided with a circular concave depression 42 which is surrounded by an annular sealing rim 43. Nut 14 is provided with a screw-receiving nut bore 44 which extends axially entirely through nut head 32 and nut shank 30. As FIG. 8 shows, nut bore 44 comprises an unthreaded counter bore portion 44A near its head end which is of slightly larger diameter than the outside diameter of the nut screw thread 24 to facilitate insertion of screw shank 22 into nut bore 44 as nut 14 is pushed onto screw 12. Nut shank 30 is provided with a plurality (two) of slots 46, each of which extends axially from rear surface 38 of nut head 32 to the remote or rear end of nut shank 30 and communicates along its entire length with nut bore 44. Thus, each pair of adjacent slots 46 defines or bounds a flexible resilient leg 50 which is part of nut shank 30. As FIG. 8 best shows, a portion of nut bore 44 is threaded. More specifically, a portion of the inner surface 52 of each leg is provided with threads 54 for engaging the screw thread 24 of screw 12. As FIG. 8 shows, those nut threads 54A nearest the unthreaded counter bore portion 44A of nut bore 44 are formed in the wall of a cone-shaped or tapered portion of nut bore 44, as shown by the outwardly-diverging lines 54B, to further facilitate reception of screw thread 24 of screw 12 as nut 14 is pushed onto the screw. Each leg 50 is connected to one of the aforementioned webs 34 as above-described and the web operates to flex its associated leg relative to nut bore 44 when nut head 32 is flexed.

In installation and operation of fastener 10, panel 16 is mounted on panel 18 so that screw shank 22 extends through hole 19 in panel 18 and screw head 26 bears against the outer side of panel 18. Nut 14 is pushed axially in the direction of arrow A (FIG. 2) onto screw shank 22 from the rear side of panel 18 until it bears against panel 18. The legs 50 of nut 14 swing outwardly in slightly the direction of the arrows B (FIG. 2) to enable the nut threads 54 to slide across the screw thread 24. After nut 14 engages panel 18, the nut is rotated slightly (about 90°) on the screw thread 24 so that the threads 54 and 24 engage to cause flexible nut head 32 to bear snugly up against the rear side of panel 18. As nut head 32 snugs up, sealing rim 43 thereon surrounds panel hole 19 and operates to seal the hole from the rear side of panel 18. Furthermore, nut head 32 flexes in the direction of the arrows C (FIG. 2) as it is snugged up and this motion is transmitted by the webs 34 to the legs 50 forcing the legs in the direction of the arrows D (FIG. 2). This forces the threads 54 on the legs 50 tightly against the threads 24 on screw 12 and effectively locks nut 14 on screw 12. Nut 14 is removed from screw 12 in the conventional manner by rotating the nut in the direction opposite that used when the nut was snugged up.

If an attempt is made to remove panel 16 while nut 14 is in place by pulling or prying panel 16 in the direction of arrow A (FIG. 2), the rim 43 of nut head 32 is forced against the rear side of panel 18 and nut head 32 flexes. Force is thus exerted by head 32 in the direction of the arrows C (FIG. 2) and through the webs 34 to the legs 50 which are then forced further in the direction of the arrows D (FIG. 2) thereby more tightly locking the nut threads 54 against the screw thread 24.

It is noteworthy that nut 14, because of its shape and size, is easy to grasp manually by the person installing it and also protects the installer's hand from the sharp edges of the thread 24 on screw 12.

Figure 4:
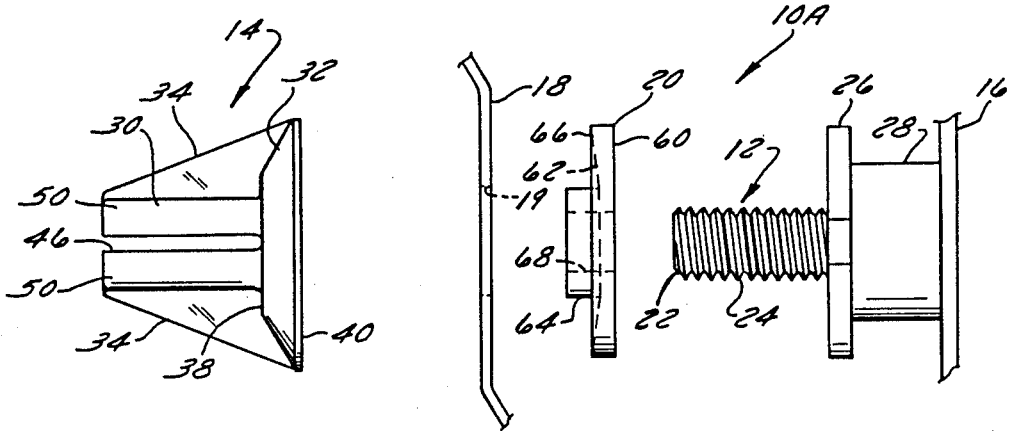
FIG. 4 is an exploded view of the fastener of FIG. 3.
Figure 7:
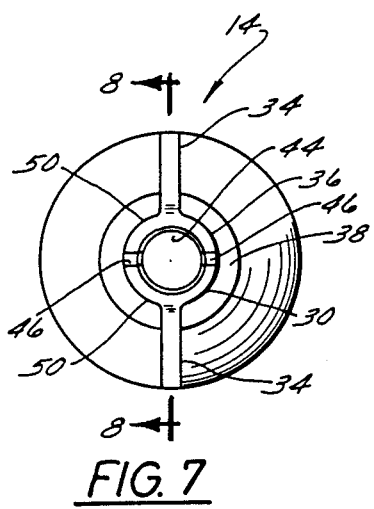
FIG. 7 is a rear end elevation view of the nut of FIG. 5.
Figure 5:
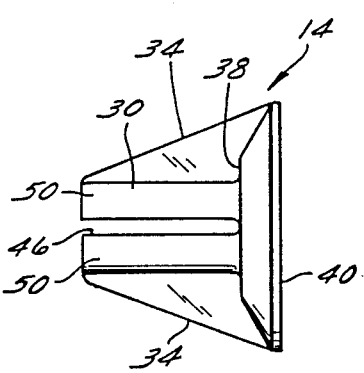
FIG. 5 is an enlarged side elevation view of the nut in accordance with the invention.
Figure 6:
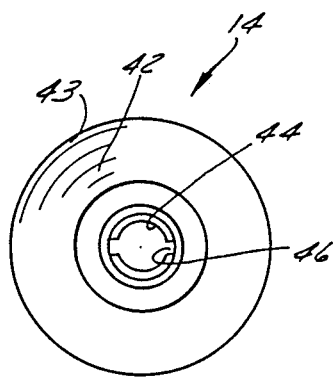
FIG. 6 is a front end elevation view of the nut of FIG. 5.

FIGS. 3 and 4 show the second embodiment of the invention which takes the form of a fastener 10A. Fastener 10A employs all of the same components as above-described fastener 10 but, in addition, employs the washer 20. Washer 20 operates to seal the hole 19 from the front side of panel 18 and also seal against the thread 24 on screw 12. Washer 20 is preferably fabricated of flexible resilient plastic material, such as "Santoprene" (TM Trademark of Monsanto Chemical Company), as by injection molding, but could be made of other materials such as rubber or the like.

Washer 20 is circular and has a flat front surface 60, a concave rear surface 62 having an annular rim 66, an annular collar 64 integral with and extending rearwardly from the concave surface, and a circular washer bore 68 extending entirely through the washer. The diameter of washer 20 is substantially greater than that of hole 19 in panel 18 and the diameter of its annular collar 64 is slightly greater than hole 19. The washer bore 68 is slightly smaller than the diameter of the thread 24 on screw 12.

In installation and operation of fastener 10A, washer 20 is attached to panel 18 by press-fitting its collar 64 in panel hole 19. Then, threaded shank 22 of screw 12 is force-fitted through the undersized bore 68 in washer 20. Finally, nut 14 is pressed onto threaded screw shank 22 of screw 12 and secured (as herebefore described) in connection with fastener 10. Since washer 20 is disposed between panel 18 and screw head 26 of screw 12, when nut 14 is fully installed, washer 20 flexes slightly and its rim 66 is forced tightly against the outer side of panel 18 to seal hole 19 on. The collar 64 is also forced tightly and in sealed relationship against the thread 24 on screw 12.

I claim:

1. As an article of manufacture, a one-piece nut for a threaded member which is connected to an object and extends though a hole in a panel having opposite sides, said nut being locatable on one side of said panel and operable to releasable secure the object on the other side of the panel and being further operable to seal said hole, said nut comprising:
   a resilient flexible nut head having a concave sealing surface continuous about its periphery engageable with said one side of said panel and for surrounding said hole;
   a nut shank projecting from said nut head and having a remote end;
   said nut head and said nut shank having a bore extending therethrough for receiving said threaded member, said bore having an insertion end near said nut head;
   said nut having a plurality of slots extending inwardly from said remote end thereof toward said nut head and communicating with said bore so as to divided said nut shank into a plurality of resilient flexible legs each having an outer surface and an inner surface;
   threaded means on said inner surface of each leg engageable with said threaded member;
   and a plurality of webs, each web being connected to said resiliently flexible nut head and to said outer surface of a resiliently flexible leg adjacent said threaded means;
   said nut being slidably movable onto and along said threaded member into an installed position wherein said concave surface of said resiliently flexible nut head is engageable with said one side of said panel and flexes in one direction to thereby seal said hole;
   said nut being rotatably movable along said threaded member away from said installed position whereby said resiliently flexible nut head flexes opposite to said one direction and said concave surface disengages from said one side of said panel to unseal said hole;
   said webs being operable, when said nut is disposed on said threaded member and said nut head is moved into or out of engagement with said one side of said panel, to transmit motion from said nut head to said legs in a direction tending to effect closure or opening, respectively, of said slots and to thereby force said threaded means on said inner surfaces of said legs into or out of locking engagement, respectively, with said threaded member.

2. An article of manufacture according to claim 1, wherein said bore has an unthreaded portion in said insertion end thereof which first receives said threaded member and which is of greater diameter than said threaded member to facilitate insertion thereof.

3. An article of manufacture according to claim 4 wherein said bore further comprises a conically-shaped threaded portion adjacent unthreaded portion which is defined by said thread means on said inner surface of said legs to facilitate screw insertion.

4. A fastener for use wit a panel having opposite sides and a hole therethrough, said fastener comprising:
   a threaded member and a one-piece nut for said threaded member which is connect®d to an object and extends though said hole in said panel,
   said nut being locatable on one side of said panel and operable to releasably secure the object on the other side of the panel and being further operable to seal said hole, said nut comprising:
   a resilient flexible nut head having a concave sealing surface continuous about its periphery engageable with said one side of said panel and for surrounding said hole;
   a nut shank projecting from said nut head and having a remote end;
   said nut head and said nut shank having a bore extending therethrough for receiving said threaded member, said bore having an insertion end near said nut head;
   said nut shank having a plurality of slots extending inwardly from said remote end thereof toward said nut head and communicating with said bore so as to divide said nut shank into a plurality of resiliently flexible legs each having an outer surface and an inner surface;
   threaded means on said inner surface of each leg engageable with said threaded member;
   and a plurality of webs, each web being connected to said resiliently flexible nut head and to said outer surface of a resiliently flexible leg adjacent said threaded means;
   said nut being slidably movable onto and along said threaded member into an installed position wherein said concave surface of said resiliently flexible nut head is engageable with said one side of said panel and flexes in one direction to thereby seal said hole;
   said nut being rotatably movable along said threaded member away form said installed position whereby said resiliently flexible nut head flexes opposite to said one direction and said concave surface disengages from said one side of said panel to unseal said hole;
   said webs being operable, when said nut is disposed on said threaded member and said nut head is moved into or out of engagement with said one side of said panel, to transmit motion from said nut head to said legs in a direction tending to effect closure or opening, respectively, of said slots and to thereby force said threaded means on said inner surfaces of said legs into or out of locking engagement, respectively, with said threaded member.

5. A fastener according to claim 4 further comprising a washer for disposition on said threaded member between said object and said other side of said panel for further sealing said hole in said panel, said washer being resiliently flexible and comprising a collar for press-fitting in said hole in said panel, said washer having a hole therethrough which is of smaller diameter than said threaded member.

* * * * *